United States Patent [19]
Nosal

[11] Patent Number: 5,357,259
[45] Date of Patent: Oct. 18, 1994

[54] AIRCRAFT DEPLOYABLE ROTATING PHASED ARRAY ANTENNA

[75] Inventor: Paul Nosal, Bethpage, N.Y.

[73] Assignee: Grumman Aerospace Corporation, Bethpage, N.Y.

[21] Appl. No.: 106,874

[22] Filed: Aug. 13, 1993

[51] Int. Cl.5 .............................................. G01S 1/44
[52] U.S. Cl. .................................. 342/398; 342/372; 343/705
[58] Field of Search ................. 342/372, 398; 343/757, 343/763, 766, 705

[56] References Cited

U.S. PATENT DOCUMENTS

| | | | |
|---|---|---|---|
| 3,953,857 | 4/1976 | Jenks | 343/705 |
| 4,529,986 | 7/1985 | d'Auria et al. | 342/372 |
| 4,912,477 | 3/1990 | Lory et al. | 342/373 |
| 5,049,891 | 9/1991 | Ettinger et al. | 343/705 |
| 5,238,208 | 8/1993 | Davis | 343/705 |

Primary Examiner—Theodore M. Blum
Attorney, Agent, or Firm—Pollock, Vande Sande & Priddy

[57] ABSTRACT

A stacked Yagi phased array is located within a foil-shaped enclosure that is connected to a rotary joint which allows rotation of the antenna over 360° in azimuth. The radar is normally stored within the equipment bay of an aircraft and is deployed therefrom when radar surveillance by the aircraft is desired. When the antenna is stored, aircraft drag is reduced and radar signature is low. The combination of mechanical and electronic scan permits increased search in critical sectors of interest and allows skipping of other sectors. The rotary joint of the invention requires no RF power or analog signals to pass through it.

6 Claims, 2 Drawing Sheets

AIRCRAFT DEPLOYABLE ROTATING PHASED ARRAY ANTENNA

FIELD OF THE INVENTION

The present invention relates to radar systems, and more particularly to a low frequency aircraft radar antenna.

BACKGROUND OF THE INVENTION

Aircraft early warning (AEW) surveillance radar systems use both electronic phased array and mechanically rotating antenna structures.

Although phased array radar systems have distinct advantages, aircraft mounted single antenna systems cannot generally search 360° in azimuth. Nor can they reposition themselves quickly so as to cover critical sectors and skip sectors that are not of interest.

In the case of mechanically rotating antennas, large dome structures are customary and this produces drag—reducing aircraft performance. Reliability problems become apparent in rotating mechanical antenna structures due to the fact that RF power and analog signals must pass through a rotating joint. An additional problem is the customary fixed dwell time of sector surveillance thereby precluding increased dwell for critical sectors.

BRIEF DESCRIPTION OF THE PRESENT INVENTION

The present invention utilizes a unique combination of a phased array and a mechanically rotating structure to avoid the problems of individual phased array and mechanically rotating systems as just discussed.

The present invention is directed to an aircraft early warning (AEW) surveillance radar using the combination of mechanical and electronic scanning. A phased array is located on a mechanically rotating structure referred to as a roto-plank and is deployed from the aircraft equipment bay during periods of active AEW radar surveillance.

The roto-plank phased array combination, unlike mechanically fixed beam antennas, permits instant detection verification while searching 360° in azimuth. It therefore allows sectors that are not of interest to be skipped while increasing dwell time for the critical sectors—electronic scanning occurring when mechanical rotation is stopped. This permits rapid update tracking of all targets within a sector. Electronic scanning can be used simultaneous with the mechanical rotation of the roto-plank. A UHF array typically consists of 18 double stacked Yagi elements, each driven with a transmit/receive (T/R) module mounted directly behind the element. A Yagi array element is ideally suited for this application because it obtains its directivity along the horizontal dimension, permitting a relatively flat, horizontally mounted roto-plank which minimizes air drag.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
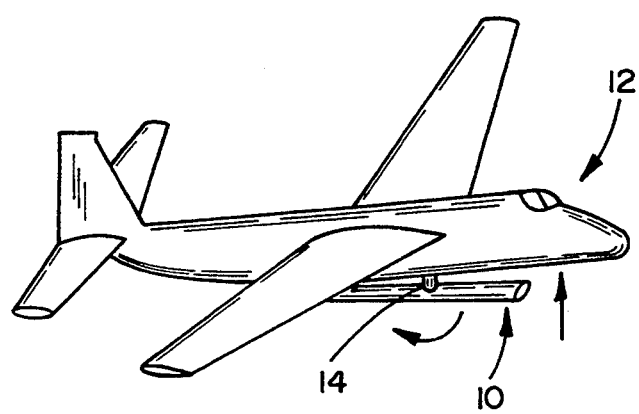
FIG. 1 is a diagrammatic illustration of an aircraft equipped with the antenna of the present invention.

The diagrammatic illustration in FIG. 1 shows the mounting of a rotating phased array antenna 10 retractably mounted under an aircraft 12 and connected thereto by a rotary joint 14. The antenna structure is deployed from an equipment bay of the aircraft when surveillance is necessary and is retracted therein during periods of non-surveillance thus minimizing drag on the aircraft. The antenna structure itself rotates about the axis of the rotary joint—normally in a vertical direction.

Figure 2:
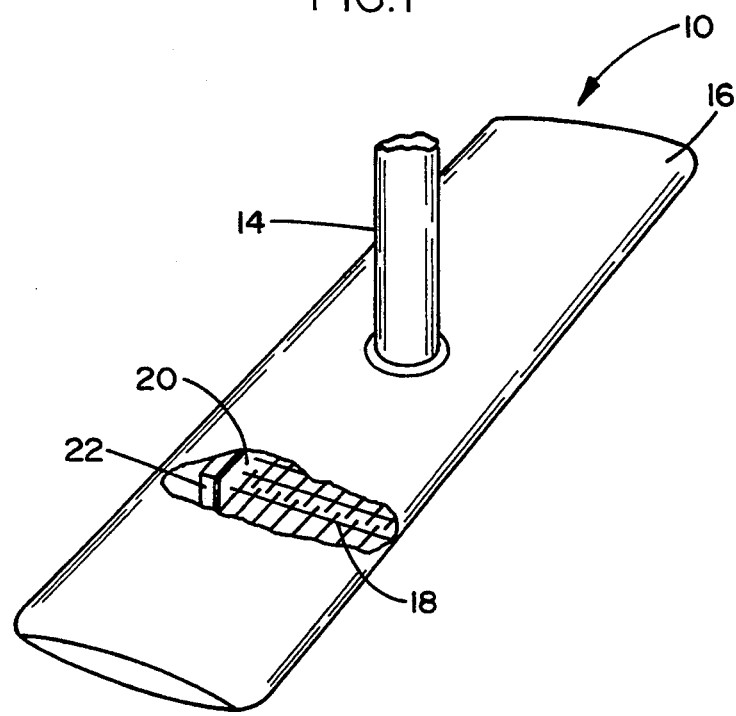
FIG. 2 is a partial cut-away view of the present antenna.

FIG. 2 is a diagrammatic cut-away view of the antenna structure indicating an antenna enclosure 16 which is foil shaped to reduce drag. Within the enclosure are double stacked Yagi elements generally indicated by reference numeral 18. The elements extend from a first surface of a support plate 20, an opposite surface mounting respective transmit/receive (T/R) modules. The elements and modules are of conventional design.

Figure 3:
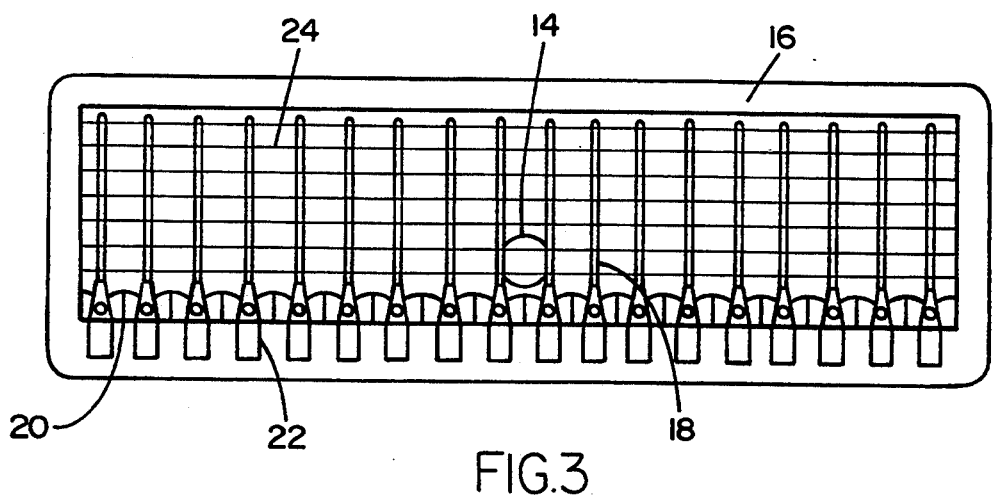
FIG. 3 is a top plan cut-away view of the present invention.

FIG. 3 is a cut-away top plan view of a preferred embodiment of the present invention wherein double stacked Yagi elements 18 are arranged in 18 columns within the enclosure 16. It is to be understood that 18 columns are shown by way of example only. The directors 24 of the elements extend in parallel relationship across the width of the enclosure. The respective directors of the Yagi elements may be electrically separated by dielectric spacers. The fabrication of the Yagi array is in accordance with conventional techniques.

Figure 4:
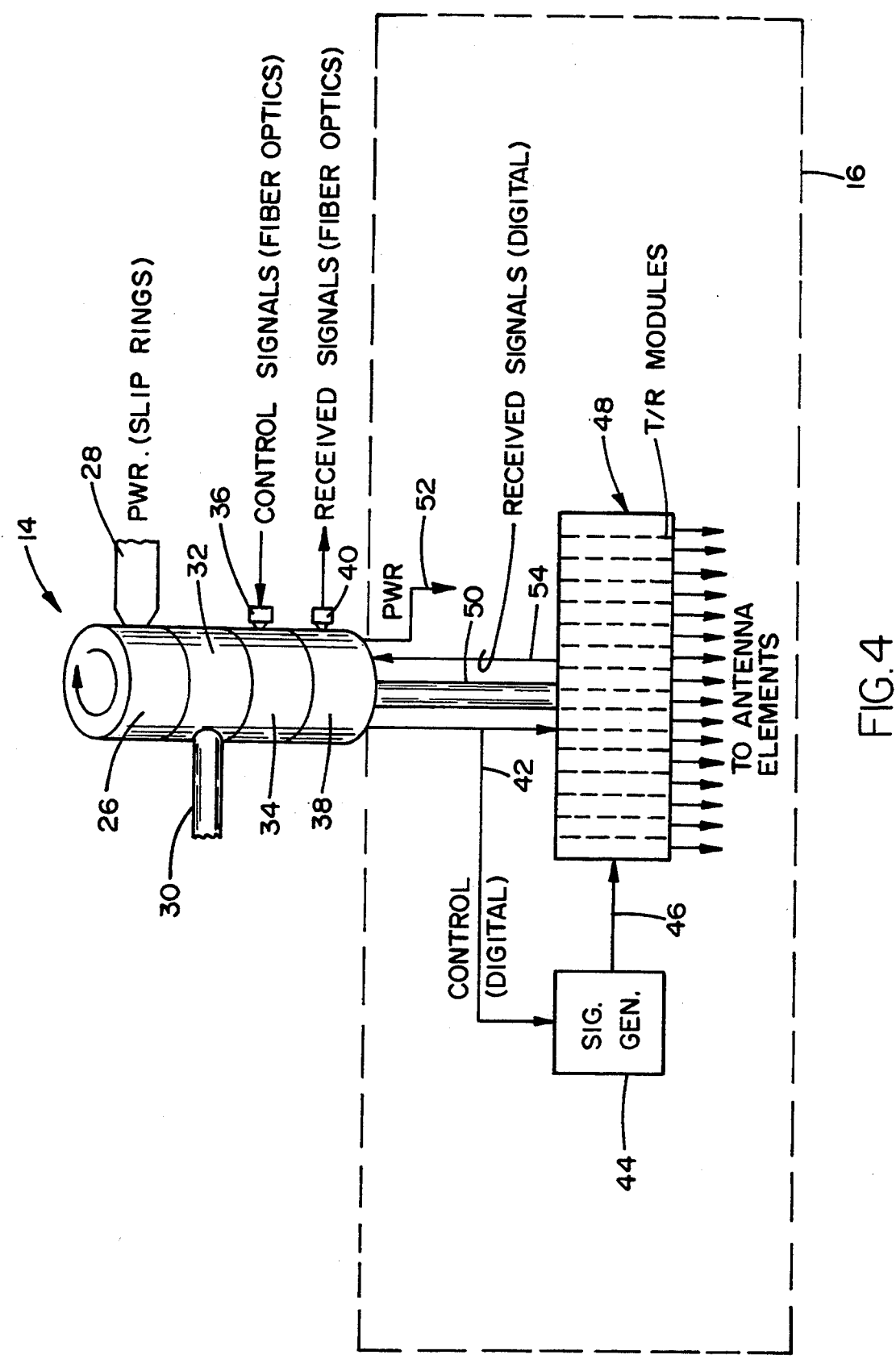
FIG. 4 is a diagrammatic illustration of a rotary joint used in connection with the present invention.

FIG. 4 diagrammatically illustrates a rotary joint which may be employed to connect avionics systems of the aircraft to the antenna elements. The rotary joint, generally indicated by reference numeral 14, includes a first slip ring section 26 which is provided with a power input 28. Cooling fluid is provided at an inlet tube 30 and coupled via coupling section 32 to the electronics within the antenna enclosure. Control signals are provided at a fiber optics connector 36 to an additional rotary joint segment 34. Received signals are coupled through a fourth rotary joint section 38 and transmitted to aircraft avionics through a fiber optics connector 40. The control signal, which is digital, is provided to a conventional signal generator 44 which drives (46) the T/R module assembly 48. Cooling fluid circulates through tube 50, within the antenna enclosure 16, to cool the electronics within the enclosure. Power derived from the slip rings of the rotary joint is distributed along power bus 52 to the various electrical inputs of the antenna circuitry. Received digital signals are output from the T/R module assembly 48 along output line 54 to the rotary joint section 38 where it is transferred to the aircraft avionics by virtue of a fiber optics connector 40—as previously mentioned.

By virtue of the foregoing description of the invention, it is seen that the present antenna structure offers an antenna which may be deployed from the fuselage (equipment bay) of an aircraft when radar surveillance is required. It may then be stored within the equipment bay so as to reduce drag and minimize radar signature. The combination of mechanical and electronic (phased array) scan permits increased search in critical sectors while skipping other sectors of no interest.

It should be understood that the invention is not limited to the exact details of construction shown and described herein for obvious modifications will occur to persons skilled in the art.

I claim:

1. An aircraft surveillance antenna comprising:
a foil-shaped enclosure deployable from within a fuselage of an aircraft;
a plurality of phased array antenna elements located in the enclosure;
a drive shaft connected at a first end to the enclosure and at another end to the aircraft for selectively rotating the enclosure 360°; and
a rotary joint disposed along the drive shaft for coupling therethrough
electrical power and control signals to the antenna elements; and
received signals from the antenna elements;
the antenna being capable of simultaneous mechanical rotation and electronic radar scan.

2. The antenna set forth in claim 1 wherein the phased array comprises a plurality of Yagi elements.

3. The antenna set forth in claim 1 together with a plurality of transmit/receive modules located within the enclosure and respectively mounted rearwardly of each element of the array.

4. The antenna set forth in claim 2 wherein the Yagi elements are arranged in a double stacked configuration within the enclosure.

5. An aircraft surveillance antenna comprising:
a foil-shaped enclosure deployable from within a fuselage of an aircraft;
a plurality of phased array Yagi antenna elements located in the enclosure;
a plurality of transmit/receive modules located within the enclosure and respectively mounted rearwardly of each element of the array;
a drive shaft connected at a first end to the enclosure and at another end to the aircraft for selectively rotating the enclosure 360°;
a rotary joint disposed along the drive shaft and including
slip rings for coupling external power to the modules;
first fiber optic means for coupling control signals to a signal generator located inside the enclosure; and
second fiber optic means for coupling received signal from the modules to an external utilization device;
the antenna being capable of simultaneous mechanical rotation and electronic radar scan.

6. The antenna set forth in claim 5 wherein the rotary joint further comprises a means for coupling external cooling fluid to the interior of the enclosure for cooling the modules located therein.

* * * * *